United States Patent [19]

Porter, Jr. et al.

[11] Patent Number: 4,849,283

[45] Date of Patent: Jul. 18, 1989

[54] COMPOSITE COATINGS EMPLOYING POLYEPOXIDES AND POLYACID CURING AGENTS IN BASE COATS

[75] Inventors: Samuel Porter, Jr., Natrona Heights; Dennis A. Simpson, Koppel; William P. Blackburn, Evans City, all of Pa.

[73] Assignee: PPG Industries, Inc., Pittsburgh, Pa.

[21] Appl. No.: 74,130

[22] Filed: Jul. 16, 1987

[51] Int. Cl.$^4$ .................. B05D 1/36; B05D 7/00; B32B 15/08

[52] U.S. Cl. .................... 428/323; 428/414; 428/416; 428/418; 428/500; 428/463; 427/407.1

[58] Field of Search ............... 428/418, 323, 413, 500, 428/416; 427/407.1

[56] References Cited

U.S. PATENT DOCUMENTS

| | | | |
|---|---|---|---|
| 2,683,131 | 7/1954 | Cass | 260/45.4 |
| 2,712,535 | 7/1955 | Fisch | 260/45.4 |
| 2,857,354 | 10/1958 | Fang | 260/33.2 |
| 2,890,194 | 6/1959 | Phillips et al. | 260/45.4 |
| 2,890,210 | 6/1959 | Phillips et al. | 260/78.4 |
| 3,008,914 | 11/1961 | Fry | 260/33.4 |
| 3,179,714 | 4/1965 | Brockman et al. | 260/837 |
| 3,215,756 | 11/1965 | Lombardi et al. | 260/834 |
| 3,218,274 | 11/1965 | Boller et al. | 260/22 |
| 3,269,975 | 8/1966 | Lee | 260/37 |
| 3,408,215 | 10/1968 | Wismer et al. | 106/252 |
| 3,523,143 | 8/1970 | Kwong | 260/835 |
| 3,528,935 | 9/1970 | Marion et al. | 260/23 |
| 3,781,380 | 12/1973 | Labana et al. | 260/836 |
| 3,785,635 | 9/1973 | Labana et al. | 260/836 |
| 3,787,521 | 1/1974 | Labana et al. | 260/836 |
| 3,925,507 | 12/1975 | Katsimbas | 260/836 |
| 3,932,367 | 1/1976 | Labana et al. | 260/78.4 |
| 3,953,644 | 4/1976 | Camelon et al. | 428/220 |
| 3,954,712 | 5/1976 | Lottanti et al. | 260/47 |
| 3,975,314 | 8/1976 | Smyk et al. | 260/2 |
| 4,046,727 | 9/1977 | Itoh et al. | 260/28.5 |
| 4,102,942 | 7/1978 | Smith et al. | 260/836 |
| 4,147,679 | 4/1979 | Scriven et al. | 428/426 X |
| 4,226,755 | 10/1980 | Knecht | 260/31.4 |
| 4,291,137 | 9/1981 | Nakate et al. | 525/162 |
| 4,346,144 | 8/1982 | Craven | 428/335 |
| 4,350,790 | 9/1982 | Chattha | 525/110 |
| 4,359,554 | 11/1982 | Labana et al. | 525/386 |
| 4,403,093 | 9/1983 | Hartman et al. | 528/297 |
| 4,418,182 | 11/1983 | Chattha | 525/438 |
| 4,465,815 | 8/1984 | Knecht | 525/443 |
| 4,471,025 | 9/1984 | Bernelin et al. | 428/413 |
| 4,548,963 | 10/1985 | Cluff et al. | 423/427 |
| 4,650,718 | 3/1987 | Simpson et al. | 428/413 |

FOREIGN PATENT DOCUMENTS

| | | |
|---|---|---|
| 84/00768 | 3/1984 | World Int. Prop. O. |
| 84/00770 | 3/1984 | World Int. Prop. O. |
| 84/00771 | 3/1984 | World Int. Prop. O. |

OTHER PUBLICATIONS

Handbook of Epoxy Resins, Henry Lee, Technical Director and Kris Neville, Project Engineer; The Epoxylite Corporation; published by McGraw-Hill, Inc., 1967; Chapter 11, pp. 11-17 to 11-22.

*Primary Examiner*—P. C. Ives
*Attorney, Agent, or Firm*—Godfried R. Akorli

[57] ABSTRACT

A color plus clear composite coating and process are disclosed. A pigmented or colored base coat is first applied to a substrate followed by the application of a transparent top coat to the base coat. The base coat composition is a liquid crosslinkable composition comprising a polyepoxide and a polyacid curing agent which comprises a half ester formed from reacting an acid anhydride with a polyol. The top coat composition is a powder coating. The resultant composite coating exhibits improved distinctness of image, making the composite coating particularly useful as an automotive top coat.

16 Claims, No Drawings

COMPOSITE COATINGS EMPLOYING POLYEPOXIDES AND POLYACID CURING AGENTS IN BASE COATS

BACKGROUND OF THE INVENTION

1. Field of the Invention

The present invention relates to curable compositions comprising polyepoxides and polyacid agents. More specifically, the present invention relates to composite coatings which are color plus clear coatings wherein the clear top coats are powder coatings. The invention also relates to the process for preparing color plus clear coated articles and to the coated articles themselves.

2. Brief Description of the Prior Art

Color plus clear coatings involving the application of a colored or pigmented base coat to a substrate followed by the application of a transparent or clear top coat to the base coat are becoming increasingly popular as original finishes for automobiles. The color plus clear coatings have outstanding appearance, manifesting in gloss and distinctness of image (DOI). The nature of the clear coat is particularly important for these properties.

Also, the nature of the base coats can be important for these properties. Generally, base coats containing the likes of melamines that produce volatile emissions during cure can adversely affect the appearance of the color plus clear coatings. In the instance of powder coatings, the emissions and associated problems can become more pronounced. This is because powder coatings are generally baked to relatively high temperatures at which volatile emissions are more readily produced.

It is an object of the present invention to provide the means for avoiding problems of appearance in color plus clear coatings, particularly those involving powder coatings.

SUMMARY OF THE INVENTION

In accordance with the foregoing, the present invention encompasses:

an improved composite multi-layered coating composed of a pigmented base coat over which is applied to a clear powder top coat, in which the improvement is a base coat which comprises a liquid crosslinkable composition comprising a polyepoxide and a polyacid curing agent, and optionally comprising an auxilliary curing agent.

The present invention also encompasses substrates having the composite multi-layered coatings on their surfaces. The term "composite" is intended to denote that there is a combination of the essential characteristics of the individual coatings, i.e., the base and top coats to produce the final coating of this invention.

DETAILED DESCRIPTION OF THE INVENTION

The base coat is a crosslinkable composition comprising a polyepoxide and a polyacid which comprises a half ester formed from reacting an acid anhydride with a polyol.

Among the polyepoxides which can be used are epoxy-containing acrylic polymers, which are preferred, epoxy condensation polymers such as polyglycidyl ethers of alcohols and phenols and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups. Examples of ethylenically unsaturated monomers containing epoxy groups are those containing 1,2-epoxy groups and include glycidyl acrylate, glycidyl methacrylate, and allyl glycidyl ether.

Examples of ethylenically unsaturated monomers which do not contain epoxy groups are alkyl esters of acrylic and methacrylic acid containing from 1 to 20 atoms in the alkyl group. Specific examples of these are acrylates and methacrylates such as methyl methacrylate, ethyl methacrylate, butyl methacrylate, ethyl acrylate, butyl acrylate, and 2-ethylexyl acrylate. Examples of other polymerizable ethylenically unsaturated monomers are vinyl aromatic compounds, nitriles, vinyl and vinylidene halides, and vinyl esters such as vinyl acetate. Acid group-containing copolymerizable ethylenically unsaturated monomers such as acrylic and methacrylic acid are preferably not used because of the possible reactivity of the epoxy and acid group.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers, are the alkyl esters of acrylic and methacrylic acid.

In preparing the epoxy-containing acrylic polymer, the epoxide functional monomers and the other ethylenically unsaturated monomers can be mixed and reacted by conventional free radical initiated solution polymerization as generally described above.

The epoxy-containing acrylic polymer typically has a number average molecular weight between about 500 and 20,000, preferably 1,000 to 10,000, and more preferably from 1,000 to 5,000. The molecular weight is determined by gel permeation chromatography using a polystyrene standard. In determining molecular weights in this fashion, what is measured is not the actual molecular weight but an indication of the molecular weight as compared to a standard such as polystyrene. The values which are obtained are commonly referred to as polystyrene numbers. However, for the purposes of this invention, they are referred to as molecular weight.

The epoxy condensation polymers which are used are polyepoxides, having a 1,2-epoxy equivalency greater than 1, preferably greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)propane (bisphenol A), 1,1-bis(4-hydroxyphenyl)ethane, and 2-methyl-1,1-bis(4-hydroxyphenyl)propane. Examples of suitable aliphatic alcohols are ethylene glycol, diethylene glycol, 1,2-propylene glycol, and 1,4-butylene glycol. Also, cycloaliphatic polyols, such as 1,2-cyclohexanediol, 1,4-cyclohexanediol, 1,2-bis(hydroxymethyl)cyclohexane, and hydrogenated bisphenol A, can also be used.

Besides the epoxy-containing polymers described above, certain polyepoxide monomers and oligomers can also be used. Examples of these materials are described in U.S. Pat. No. 4,102,942 in column 3, lines 1-16. Specific examples thereof which are low molecular weight polyepoxides are 3,4-epoxycyclohexylmethyl, 3,4-epoxycyclohexanecarboxylate, and bis(3,4-epoxy-6-methylcyclohexylmethyl)adipate. These materials are aliphatic polyepoxides as are the epoxy-containing acrylic polymers.

The polyepoxide is present in the crosslinkable composition in amounts of about 10 to 90, preferably from 25 to 75 percent by weight based on total weight of resin solids.

The polyacid contains two or more acid groups per molecule which are reactive with the polyepoxide to form a crosslinked coating as indicated by the resistance of the coating to organic solvent. The polyacid comprises a half ester formed from reacting an acid anhydride with a polyol. The acid functionality is preferably a carboxylic acid although other acids, such as sulfonic acid, may be used but their use is not preferred. The half esters are relatively low in molecular weight and quite reactive with epoxies enabling the formulation of high solids fluid compositions.

The half ester is obtained by reacting a polyol and a 1,2-acid anhydride under conditions sufficient to ring open the anhydride and to form the half ester with substantially no polyesterification occurring. The reaction products are of relatively low molecular weight with narrow molecular weight distributions and provide lower volatile organic contents in the coating composition while still providing for excellent properties in the resultant coating. By "substantially no polyesterification occurring" is meant that the carboxyl groups of the anhydride are not esterified by the polyol in a recurring manner. By this is meant that less than 10, preferably less than 5 percent by weight polyester is formed.

Two reactions may occur in combining the anhydride and the polyol together under suitable reaction conditions. The desired reaction mode involves ring opening the anhydride ring with hydroxyl, i.e.,

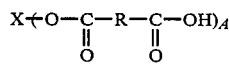

where X is the residue of the polyol after reaction with the 1,2-dicarboxylic acid anhydride, R is an organic moiety associated with the anhydride, and A is equal to at least 2.

Subsequently, carboxyl groups formed by opening of the anhydride ring may react with hydroxyl groups to give off water via a condensation reaction. This latter reaction is not desired since it can lead to polycondensation reaction resulting in products with higher molecular weights.

For the desired ring opening reaction and half ester formation, a 1,2-dicarboxylic anhydride is used. Reaction of a polyol with a carboxylic acid instead of an anhydride would require esterification by condensation eliminating water which would have to be removed by distillation. Under these conditions, this would promote undesired polyesterification. Also, the reaction temperature is preferably low, that is, no greater than 135° C., preferably less than 120° C., and usually within the range of 70°-135° C., preferably 90°-120° C. Temperatures greater than 135° C. are undesirable because they promote polyesterification, whereas temperatures less than 70° C. are undesirable because of sluggish reaction. The time of reaction can vary somewhat depending principally upon the temperature of reaction. Usually the reaction time will be from as low as 10 minutes to as high as 24 hours.

To achieve the desired reaction, the 1,2-acid anhydride and polyol are contacted usually by mixing the two ingredients together in a reaction vessel. Preferably, the reaction is conducted in an inert atmosphere of, say, nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well other organic solvents such as dimethyl formamide and N-methyl-pyrrolidone.

The equivalent ratio of anhydride to hydroxy on the polyol is preferably at least about 0.8:1 (the anhydride being considered monofunctional) in order to obtain maximum conversion to the desired half ester. Ratios less than 0.8:1 can be used but such ratios result in increased formation of less preferred half esters.

Among the anhydrides which can be used in the formation of the desired half esters are those which contain from about 2 to 30 carbon atoms, exclusive of the carbon atoms of the anhydride moiety. Examples thereof are aliphatic, including cycloaliphatic, olefinic and cycloolefinic and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be chloro, alkyl, and alkoxy. Specific examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, and alkyl hexahydrophthalic anhydrides such as methylhexahydrophthalic anhydride, tetrachlorophthalic anhydride, endomethylene tetrahydrophthalic anhydride, chlorendic anhydride, itconic anhydride, citraconic anhydride, and maleic anhydride.

Among polyols which can be used in the formation of the desired half esters are those which contain from about 2 to 20 carbon atoms. Preferred are diols, triols, and mixtures thereof. Specific examples include aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, trimethylolpropane, 2,2,4-trimethylpentane-1,3-diol, pentaerythritol and 1,2,3,4-butane-tetrol. Aromatic polyols such as bisphenol A and bis(hydroxymethyl)xylene can also be used.

The half ester is present in the coating composition in amounts of about 10 to 90, preferably 25 to 75 percent by weight based on the total weight of resin solids. The ratio of the acid group to the epoxide group is from 0.3 to 3:1.

The polyepoxide and the half ester are the essential ingredients in the crosslinkable composition. However, there are other ingredients which can be considered as optional, but are rather typical of the base coat composition. These include an acid functional acrylic polymer and an anhydride in their use as follows.

The equivalent ratio of carboxyl to epoxy in the base coat film-forming compositions is preferably adjusted so that there are about 0.3 to 3.0, preferably from 0.8 to 1.5 equivalents of carboxyl (anhydride being considered monofunctional) per equivalent of epoxy.

The base coat compositions are preferably free of a catalyst. However, a catalyst may be added to accelerate the cure of the epoxy and acid groups with the proviso that the presence of a catalyst does not adversely affect the stability of the crosslinkable composition as a base coat. Examples of suitable catalysts include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide. The amount of a catalyst is typically from 0 to 10, preferably 0.5 to 3 percent by weight based on resin solids.

The polyepoxide-polyacid compositions are formulated into coating compositions which contain about 30 percent or higher by weight resin solids. The solids content is determined by heating the composition to 105°–110° C. for one to two hours to drive off the volatile material.

Also, optional ingredients, such as plasticizers, antioxidants, and UV light absorbers, can be included in the composition. These ingredients typically are present in amounts of up to 25 percent by weight based on the total resin weight.

The base coat composition also contains pigments to give it color. Compositions containing metallic flake pigmentation are useful for the production of so-called "glamour metallic" finishes chiefly upon the surface of automobile bodies. Proper orientation of the metallic pigments results in a lustrous shiny appearance with excellent flop, distinctness of image, and high gloss. By "flop" is meant the visual change in brightness or lightness of the metallic coating with a change in viewing angle, that is, a change from 90° to 180°. The greater the change, that is, from light to dark appearance, the better the flop. Flop is important because it accentuates the lines of a curved surface such as on an automobile body. Suitable metallic pigments include, in particular, aluminum flake, copper bronze flake, and mica.

Besides the metallic pigments, the base coat compositions of the present invention may contain nonmetallic color pigments conventionally used in the surface coating compositions. Examples thereof include inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on the weight of coating solids. The metallic pigment is employed in amounts of about 0.5 to 25 percent by weight of the aforesaid aggregate weight.

If desired, the base coat composition may additionally contain other materials well known in the art of surface coatings. These would include surfactants, flow control agents, thixotropic agents, fillers, anti-gassing agents, organic co-solvents, and other customary auxiliaries. These materials can constitute up to 40 percent by weight of the total weight of the coating composition.

In accordance with this invention, the base coat is free of, or substantially free of, ingredients that produce volatiles during cure of the base coat. In another embodiment of the invention, the base coat may contain auxiliary curing agents such as melamine resins.

The base coat compositions can be applied to various substrates to which they adhere. The compositions can be applied by conventional means including brushing, dipping, flow coating, spraying and the like, but they are most often applied by spraying. The usual spray techniques and equipment, air spraying and electrostatic spraying, and either manual or automatic methods can be used.

Coatings of the present invention can be applied over virtually any substrate including wood, metals, glass, cloth, plastic, foam, including elastomeric substrates, and the like. They are particularly useful in applying over metal and elastomeric substrates that are found on motor vehicles.

During application of the base coat composition to the substrate, a film of the base coat is formed on the substrate. Typically, the base coat will be about 0.01 to 5, preferably 0.1 to 2 mils in thickness.

After application of the base coat composition to the substrate, a film is formed on the surface of the substrate. This is achieved by driving solvent, i.e., organic solvent or water, out of the base coat film by heating or simply by air-drying. Preferably, the heating step will only be for a short period of time sufficient to ensure that the top coat composition can be applied to the base coat without the former dissolving the base coat composition, i.e., "striking in". Suitable drying conditions will depend on the particular base coat composition, on the ambient conditions, but, in general, a drying time of from about 1 to 15 minutes to a temperature of about 80°–325° F. will be adequate to ensure that mixing of the two coats is minimized. Also, more than one base coat and multiple top coats may be applied to develop the optimum appearance. Usually, between coats, the previously applied base coat or top coat is flashed that is exposed to ambient conditions for about 1 to 20 minutes.

The clear powder top coat composition can be applied to the base coated substrate by any of the conventional powder coating techniques, such as electrostatic spraying or fluidized bed, but it is preferred that electrostatic spraying be used since this gives the best gloss. The thickness of the top coat is usually from about 1 to 5 mils and preferably 1.2 to 3 mils.

The clear powder coating composition is preferably a thermosetting composition comprising an epoxy, a polyester, acrylic resin or the like. In the particularly preferred embodiment of the invention, the powder coating comprises resins which are substantially the same as the principal resins of the base coat composition.

After application of the top coat composition to the base coat, the coated substrate is heated to a temperature sufficient to provide effective cure of the multi-layered coating. In the curing operation, solvents are driven off and the film-forming material of the top coat and/or the base coat is crosslinked with the aid of any crosslinking agents present. The heating or curing operation is usually carried out at a temperature in the range of about 250° to 350° F. (121° to 177° C.) but, if needed, lower or higher temperatures may be used depending upon whether it is sufficient to activate any necessary crosslinking mechanisms. Illustratively, the heating or curing operation is conducted at the lower end of the temperature range for the embodiment of the invention wherein the likes of melamine resins are employed as auxiliary curing agents.

Curing the composite coating at the low temperature range may entail the use of powder coatings that cure at relatively low temperatures. Illustrative examples of said powder coatings are those comprising polyexpoxides and polyol-modified polyanhydrides such as disclosed in U.S. application, Ser. No. 74,105, filed July 16, 1987.

The invention will be further described by reference to the following examples. Unless otherwise indicated, all parts are be weight.

EXAMPLES

The following examples show the preparation of epoxy-containing acrylic polymers and polyacid half esters.

EXAMPLE A

An epoxy-containing acrylic polymer was prepared from the following mixture of ingredients:

| Ingredients | Weight in Grams | Percentage by Weight | |
|---|---|---|---|
| Glycidyl methacrylate | 320.0 | 40 | |
| Methyl methacrylate | 160.0 | 20 | |
| Butyl acrylate | 160.0 | 20 | |
| Butyl methacrylate | 160.0 | 20 | |
| VAZO-67[1] | 24.0 | 3.0 | (on monomers) |
| Tertiary-butyl perbenzoate | 16.0 | 2.0 | (on monomers) |
| Tertiary-butyl perbenzoate (post-addition) | 4.0 | 0.5 | (on monomers) |
| Tertiary-butyl perbenzoate (post-addition) | 4.0 | 0.5 | (on monomers) |

[1] Alpha, alpha'-dimethylazobis(isobutyronitrile) available from E. I. duPont de Nemours and Company.

Xylene (415.3 grams) was charged to a suitable reactor and heated to reflux to remove water through a Dean-Stark trap. The glycidyl methacrylate, methyl methacrylate, butyl acrylate, and butyl methacrylate were mixed together. The VAZO-67, first portion of tertiary-butyl perbenzoate and 100 grams of xylene were also premixed together. The premixture of vinyl monomers and the premixture of initiators were added simultaneously to the reaction vessel over a period of about three hours while maintaining the reaction temperature at reflux. At the completion of the addition, the reaction mixture was held at reflux for one hour followed by the addition of the second portion of tertiary-butyl perbenzoate and 25 grams of xylene. The reaction mixture was held for one hour at reflux followed by the addition of the third portion of tertiary-butyl perbenzoate and 25 grams of xylene. The reaction mixture was held for two hours at reflex followed by cooling to room temperature. The reaction mixture had a solids content of about 60 percent and a number average molecular weight of 1,456 as determined by gel permeation chromatography using a polystyrene standard.

EXAMPLE B

A polyacid half ester of 1-(3-hydroxy-2,2-dimethylpropyl)-3-hydroxy-2,2-dimethylpropionate (Ester Diol 204) and methylhexahydrophthalic anhydride was prepared from the following mixture of ingredients:

| Ingredients | Parts by Weight (in grams) |
|---|---|
| Ester Diol 204 | 2550.0 |
| Methylhexahydrophthalic anhydride | 4116.0 |
| Methyl isobutyl ketone | 1466.5 |
| Ethanol | 666.6 |

The Ester Diol 204 and 1466.5 grams of the methyl isobutyl ketone were charged to a reaction vessel and heated under a nitrogen atmosphere to 115° C. The methylhexahydrophthalic anhydride was added over a 90-minute period. The reaction mixture was then held at 115° C. for four hours. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.

EXAMPLE C

An epoxy-containing acrylic polymer was prepared from the following mixture of ingredients:

| Kettle Charge | |
|---|---|
| Ingredients | Parts by Weight |
| Butyl acetate | 906.0 |

| Charge I | | |
|---|---|---|
| Ingredients | Parts by Weight (in grams) | Percentage by Weight |
| Glycidyl methacrylate | 510.0 | 30 |
| Methyl methacrylate | 595.0 | 35 |
| Butyl acrylate | 170.0 | 10 |
| Butyl methacrylate | 425.0 | 25 |
| Butyl acetate | 200 | |

| Charge II | |
|---|---|
| Ingredients | Parts by Weight (in grams) |
| VAZO-67 | 59.5 |
| Butyl acetate | 180.0 |

| Charge III | |
|---|---|
| Ingredients | Parts by Weight (in grams) |
| VAZO-67 | 8.5 |
| Butyl acetate | 40.0 |

The kettle charge was heated in a suitable reactor to reflux to remove water through a Dean-Stark trap. Charges I and II were added simultaneously over a period of about three hours while maintaining the reaction mixture at reflux. At the conclusion of the addition of Charges I and II, the reaction mixture was held for one hour at reflux followed by the addition of Charge III over a 30-minute period. The reaction mixture was held at reflux for an additional hour followed by cooling to room temperature. The volatile materials in the reaction mixture were then removed by heating under vacuum to a solids content of 99.8 percent. The reaction product had a average molecular weight of 4,048.

EXAMPLE D

A polyacid half ester of 1,6-hexanediol-methylhexahydrophthalic anhydride was prepared from the following mixture of ingredients:

| Ingredients | Parts by Weight (in grams) |
|---|---|
| 1,6-Hexanediol | 590.0 |
| Methylhexahydrophthalic anhydride | 1680.0 |
| Methyl isobutyl ketone | 972.9 |

The 1,6-hexanediol and the methyl isobutyl ketone were charged to a reaction vessel and heated under a nitrogen atmosphere to 115° C. The methylhexahydrophthalic anhydride was charged over a two-hour period while maintaining the reaction temperature between 112°–117° C. The reaction mixture was held at this temperature for about three to four hours to a stalled acid value, i.e., acid value remained essentially constant. The reaction mixture was then cooled to room temperature and found to have a solids content measured at 110° C. of 68.0 percent and an acid value of 176.

EXAMPLE E

A polyacid half ester of trimethylopropane and methylhexahydrophthalic anhydride was prepared from the following mixture of ingredients:

| Ingredients | Parts by Weight (in grams) |
|---|---|
| Trimethylolpropane | 1341.0 |
| Methylhexahydrophthalic anhydride | 5040.0 |
| Methyl isobutyl ketone | 2734.7 |

The trimethylolpropane and the methyl isobutyl ketone were charged to a suitable reaction vessel and heated under a nitrogen atmosphere to 115° C. The methylhexahydrophthalic anhydride was charged over a two-hour period while maintaining the temperature between 112°–117° C. The reaction mixture was held at this temperature for about three hours. The reaction product was then cooled to room temperature and found to have a solids content measured at 110° C. of 69 percent and an acid value of 200.3.

EXAMPLE 1

A base coat composition of this invention was prepared by mixing together the following ingredients:

| Ingredients | Parts by Weight (in grams) | Percent Resin Solids | Percent Pigment Solids |
|---|---|---|---|
| TINUVIN 328[1] | 3.0 | 3.0 | |
| Hexyl acetate | 60.0 | — | |
| Xylene | 20.0 | — | |
| Flow control agent[2] | 22.7 | 10.0 | |
| Epoxy-containing acrylic polymer[3] | 98.4 | 57.1 | |
| Trimethylol propane-methylhexahydrophthalic anhydride half ester as in Example E | 47.0 | 32.9 | |
| Aluminum flake[4] | 18.5 | — | 12.0 |

[1]Substituted benzotriazole UV light stabilizer, available from Ciba-Geigy Corporation.
[2]Polymeric microparticle prepared in accordance with Example 11 of U.S. Pat. No. 4,147,688.
[3]Derived from 40% glycidyl methacrylate, 25% butyl acrylate, 33% methyl methacrylate, 2% styrene at 58% solids in xylene.
[4]Sixty-five percent by weight nonleafing aluminum flakes in a hydrocarbon solvent, available from Alcoa Company as 1-7/575.

The formulated coating composition contained 42.6 percent by weight resin solids and had a No. 4 Ford cup viscosity of 13.3 seconds.

ADDITIONAL EXAMPLES

In the following examples, a base coat of this invention (as in Example 1) characterized in that it does not produce volatile emissions during cure, was compared with a base coat containing a melamine resin which can produce volatile emissions. The comparison entailed applying the base coats to substrates, flashing them, and topcoating them with the same powder clear coat. The resultant composite coatings were then cured by baking the same.

EXAMPLE 2

A base coat composition was prepared in essentially the same manner as described in Example 1, except that it contained 25 percent melamine resin.

| Ingredients | Parts by Weight (in grams) | Percent Resin Solids | Percent Pigment Solids |
|---|---|---|---|
| TINUVIN 328 | 3.0 | 3.0 | |
| Hexyl acetate | 60.0 | — | |
| Xylene | 20.0 | — | |
| Flow control agent | 22.7 | 10.0 | |
| Epoxy-containing acrylic polymer | 71.0 | 41.2 | |
| Trimethylol propane-methylhexahydrophthalic anhydride half ester of Example D | 34.0 | 23.8 | |
| RESIMINE 717[1] | 29.8 | 25.0 | |
| Aluminum flake | 18.5 | — | 12.0 |

[1]Melamine resin available from Monsanto Company.

EXAMPLE 3

The powder clear coat was prepared with the following:

| Ingredients | Parts by Weight (in grams) |
|---|---|
| 12-Hydroxy stearic acid | 50.14 |
| Poly (dodecanedioc anhydride) | 206.84 |
| Epoxy-containing acrylic polymer[1] | 695.75 |
| TINUVIN 144[2] | 10.3 |
| TINUVIN 900[3] | 20.06 |
| MODAFLOW III[4] | 12.16 |

[1]40% glycidyl methacrylate, 40% methyl methacrylate, 10% butyl acrylate, and 10% styrene.
[2]Hundred amine light stabilizer from Ciba-Geigy Corporation.
[3]UV stabilizer, available from Ciba-Geigy Corporation.
[4]Flow control agent, available from Monsanto Company.

The ingredients were first blended in a WELEX mixer for two minutes, then melt blended in a Baker Perkins Twin Screw Extruder at 110° C., chilled on chill roll at 20° C., flaked and then ground in a micromill and sieved through a 200-mesh screen.

Coating Application

The base coats of the additional examples were applied to primed steel panels (using as the primer UNIPRIME, which is a cationic electrodepositable composition available from PPG Industries, Inc.). The base coat was applied by spraying (two coats at 60 psi), flash baked at 230° F. for three minutes, and then top coated with the above powder clear coat of Example 3 by electrostatic spraying. The respective composite coatings were baked at 350° F. for 30 minutes and evaluated.

Coating Evaluation:

TABLE

| Base Coat | Theory Solids | Actual Solids | Ford Cup Viscosity 70° F. (Seconds) | 20°[1] Gloss | Distinctness[2] of Image (DOI) | Tukon[3] Hardness | Adhesion[4] | Solvent[5] Resistance | Chip[6] Resistance | Film Thickness Mils Base coat | Film Thickness Mils Clear coat |
|---|---|---|---|---|---|---|---|---|---|---|---|
| Example 1 | 42.6% | 42.8% | 13.3" | 83 | 70 | 9.85 | 5 | Good | 5 (Fair) | 0.5 | 3.0 |
| Comparative Example | 44.4% | 42.3% | 14.0" | 58 | 55–20 | 9.85 | 5 | Good | 5 (Fair) | 0.5 | 2.9 |

[1] Measured with a 20° gloss meter manufactured by Gardner Instrument Company.
[2] Distinctness of image determined on a C-Box manufactured by C-Box-I²R Company.
[3] Tukon hardness determined by ASTM E-384.
[4] ASTM D-3359; the higher the value, the better the adhesion.
[5] Solvent resistance determined by placing five drops of xylene on coated panel, wiping off after five minutes and scratching the solvent-contacted surface with a fingernail (or pencils of different hardness).
Excellent - No visual effect and no softening.
Good - Some film swelling.
Fair - Some film softening.
Poor - Soft film.
Failure - Dissolved film.
[6] Chip resistance determined with a Gravelometer, Model QGR from the Q Panel Co. The chip resistance test is conducted generally in accordance with the procedure of ASTM D3170-74 except the painted panel was chilled at −10° F. instead of 10° F. and more detailed photographic standards were used. Ratings are from 0 to 9 with 0 being a failure (large sections of paint chipped off) and 9 being good with very little, if any, of the paint chipping off.

What is claimed is:

1. An improved composite coating comprising a pigmented base coat over which is applied a clear powder top coat comprising a resin selected from the group consisting of an epoxy, a polyester and acrylic resin; the improvement comprising the base coat which comprises a liquid crosslinkable composition which consists essentially of a polyepoxide and a polyacid curing agent.

2. The coating of claim 1 wherein the ratio of the acid group to the epoxide group is from 0.3 to 3:1.

3. The coating of claim 1 in which the polyepoxide is a copolymer of a monethylenically unsaturated monomer having at least one epoxy group and at least one monoethylenically unsaturated monomer which is free of epoxy groups.

4. The coating of claim 3 in which the copolymer has a number average molecular weight of between 500 and 20,000.

5. The coating of claim 4 in which the copolymer is a copolymer of glycidyl acrylate or methacrylate with at least one other copolymerizable ethylenically unsaturated monomer.

6. The coating of claim 5 in which the other copolymerizable ethylenically unsaturated monomer comprises at least in part an alkyl ester of acrylic or methacrylic acid containing from 1 to 20 carbon atoms in the alkyl group.

7. The coating of claim 5 in which the glycidyl acrylate or methacrylate comprises from 5 to 60 percent of the monomers used in preparing the epoxy-containing acrylic polymer.

8. The coating of claim 3 in which the epoxy group-containing acrylic polymer is present in the crosslinkable composition in amounts of 10 to 90 percent by weight based on total weight of resin solids.

9. The coating of claim 1 in which the crosslinkable composition further contains an auxiliary curing agent which is a melamine resin.

10. The coating of claim 1 in which the polyacid curing is a half ester of the structure:

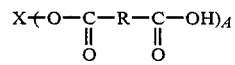

where X is the residue of the polyol after reaction with the 1,2-dicarboxylic acid anhydride, R is an organic moiety associated with the anhydride, and A is equal to at least 2.

11. The coating of claim 10 in which the polyol is a diol, triol, or mixture thereof.

12. The coating of claim 11 in which the polyol is selected from the class consisting of trimethylopropane, neopentyl glycol, and 1,6-hexanediol.

13. The coating of claim 10 in which the 1,2-dicarboxylic acid anhydride is selected from the class consisting of hexahydrophthalic anhydride and alkyl-substituted hexahydrophthalic anhydrides.

14. The coating of claim 1 in which the half ester is present in amounts of 10 to 90 percent by weight based on total weight of resin solids.

15. An improved process for preparing a composite coating on a metallic substrate which comprises applying to the substrate a pigmented base coat and applying to said base coat a clear powder coating composition to form a top coat over the base coat followed by heating the composite coating to a temperature sufficient to affect cure, the improvement comprising the base coat which is as recited in claim 1.

16. An article of matter comprising a metallic substrate which is prepared by the process of claim 15.

* * * * *

UNITED STATES PATENT AND TRADEMARK OFFICE
CERTIFICATE OF CORRECTION

PATENT NO. : 4,849,283
DATED : July 18, 1989
INVENTOR(S) : Porter, Jr. et al.

It is certified that error appears in the above-identified patent and that said Letters Patent is hereby corrected as shown below:

In claim 3 (column 11, line 33), the spelling of "monoethylenically" is incorrect. Please delete "monethylenically" and replace with --monoethylenically--.

In claim 12 (column 12, line 37), the spelling of "trimethylolpropane" is incorrect. Please delete "trimethylopropane" and replace with --trimethylolpropane--.

Signed and Sealed this

Twentieth Day of November, 1990

Attest:

HARRY F. MANBECK, JR.

*Attesting Officer*  *Commissioner of Patents and Trademarks*